(12) United States Patent
Mochizuki

(10) Patent No.: US 7,762,609 B2
(45) Date of Patent: Jul. 27, 2010

(54) STRADDLE-TYPE VEHICLE

(75) Inventor: Kan Mochizuki, Shizouka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 6 days.

(21) Appl. No.: 11/961,066

(22) Filed: Dec. 20, 2007

(65) Prior Publication Data

US 2008/0158896 A1    Jul. 3, 2008

(30) Foreign Application Priority Data

Dec. 28, 2006    (JP)    .............................. 2006-356588

(51) Int. Cl.
*B62J 17/02*    (2006.01)
(52) U.S. Cl. .................................................. 296/78.1
(58) Field of Classification Search ................ 296/78.1, 296/198, 136.07, 152, 181.2; 280/847, 848, 280/850; 150/167
See application file for complete search history.

(56) References Cited

U.S. PATENT DOCUMENTS

| | | | |
|---|---|---|---|
| 6,276,482 B1 * | 8/2001 | Moriya et al. ............... | 180/229 |
| 7,007,998 B2 * | 3/2006 | Toyofuku ................... | 296/78.1 |
| 7,374,007 B2 * | 5/2008 | Hasegawa et al. ........... | 180/219 |
| 7,401,953 B2 * | 7/2008 | Isayama ..................... | 362/474 |
| 7,431,374 B2 * | 10/2008 | Konno et al. ................ | 296/78.1 |
| 7,438,340 B2 * | 10/2008 | Kurihara .................... | 296/78.1 |
| 2006/0087144 A1 * | 4/2006 | Kamimura et al. ......... | 296/78.1 |
| 2006/0232987 A1 * | 10/2006 | Kushida et al. ............. | 362/459 |
| 2007/0047249 A1 * | 3/2007 | Kogo et al. ................. | 362/538 |
| 2008/0117643 A1 * | 5/2008 | Matsumura et al. ......... | 362/494 |

FOREIGN PATENT DOCUMENTS

JP    2005-041476    2/2005

* cited by examiner

*Primary Examiner*—H Gutman
(74) *Attorney, Agent, or Firm*—Keating & Bennett, LLP

(57) ABSTRACT

A straddle-type vehicle that ensures visibility of a flasher lamp while decreasing the possibility of damage due to a fall. A body cowl is formed with a groove that extends longitudinally of. A flasher lamp is outwardly convex in a vehicle width direction and is accommodated in the groove. An outer end of the flasher lamp is positioned inwardly of a side end portion of the body cowl in the vehicle width direction.

16 Claims, 9 Drawing Sheets

STRADDLE-TYPE VEHICLE

RELATED APPLICATIONS

This application claims the benefit of priority under 35 USC 119 of Japanese patent application no. 2006-356588, filed on Dec. 28, 2006, which application is hereby incorporated by reference in its entirety.

BACKGROUND OF THE INVENTION

1. Field of the Invention

The present invention relates to a body cowl that covers the front of a steering head pipe of a straddle-type vehicle, and a flasher lamp on a side end portion of the body cowl.

2. Description of Related Art

Straddle-type vehicles such as motorcycles often have a body cowl provided forwardly of a steering head pipe. The body cowl is typically provided with a headlight and a flasher lamp. Flasher lamps may be arranged on right and left side end portions of the body cowl (see, for example, JP-A-2005-41476, pages 5-6, FIGS. 1 and 2). However, since the flasher lamps are on sides of the body cowl, they are liable to damage when the vehicle falls or the like.

The flasher lamps may instead be arranged more inwardly of side end portions of the cowl in a vehicle width direction or toward a center of the vehicle. However, to improve visibility of the flasher lamps, they are preferably arranged on right and left side end portions of the body cowl.

SUMMARY OF THE INVENTION

The invention has been thought of in view of this situation and provides a straddle-type vehicle that ensures visibility of a flasher lamp while reducing the possibility that it will be damaged due to a fall or the like.

A straddle-type vehicle according to one aspect of the invention comprises a steering head pipe, a body cowl arranged forwardly of the steering head pipe, and a flasher lamp arranged on a side end portion of the body cowl. The body cowl is formed with a flasher lamp accommodating recess that extends longitudinally of the vehicle. The flasher lamp is outwardly convex in a vehicle width direction and is accommodated in the flasher lamp accommodating recess. An outer end of the flasher lamp is positioned inwardly of the side end portion of the body cowl in the vehicle width direction.

Because the outer end of the flasher lamp is positioned inwardly of the side end portion of the body cowl in the vehicle width direction, the possibility of damage to the flasher lamp due to a fall or the like is reduced. Also, since the flasher lamp is arranged on the side end portion of the body cowl, visibility of the flasher lamp is ensured.

In one embodiment, a front end of the flasher lamp accommodating recess is positioned forwardly of a front end of the flasher lamp.

In another embodiment, an upper end of the Rasher lamp is positioned in substantially the same position as an upper end of the flasher lamp accommodating recess.

In another embodiment, the flasher lamp is longer in a longitudinal direction than in a vertical direction.

In a further embodiment, the flasher lamp is in a form of an airfoil in side view.

In a still further embodiment, the flasher lamp accommodating recess is formed with a flasher lamp hole, into which the flasher lamp is inserted and which is latched on an outer edge of the flasher lamp. The flasher lamp is inserted into the flasher lamp hole from inside the body cowl.

A straddle-type vehicle according to another aspect of the invention comprises a steering head pipe, a body cowl arranged forwardly of the steering head pipe, and a flasher lamp arranged on a side end portion of the body cowl. The flasher lamp is outwardly convex in a vehicle width direction, and the body cowl is formed with a flasher lamp accommodating recess that extends longitudinally of the straddle-type vehicle and is opened rearward.

With such a straddle-type vehicle, travel wind flowing around the flasher lamp extending longitudinally of the straddle-type vehicle is efficiently rectified.

In one embodiment, the flasher lamp extends to a rear end of the body cowl.

In another embodiment, a front end of the flasher lamp accommodating recess is positioned forwardly of a front end of the flasher lamp.

In a further embodiment, an upper end of the flasher lamp is positioned in substantially the same position as an upper end of the flasher lamp accommodating recess.

According to the invention, a straddle-type vehicle is provided that decreases a possibility of damage to a flasher lamp while ensuring its visibility.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
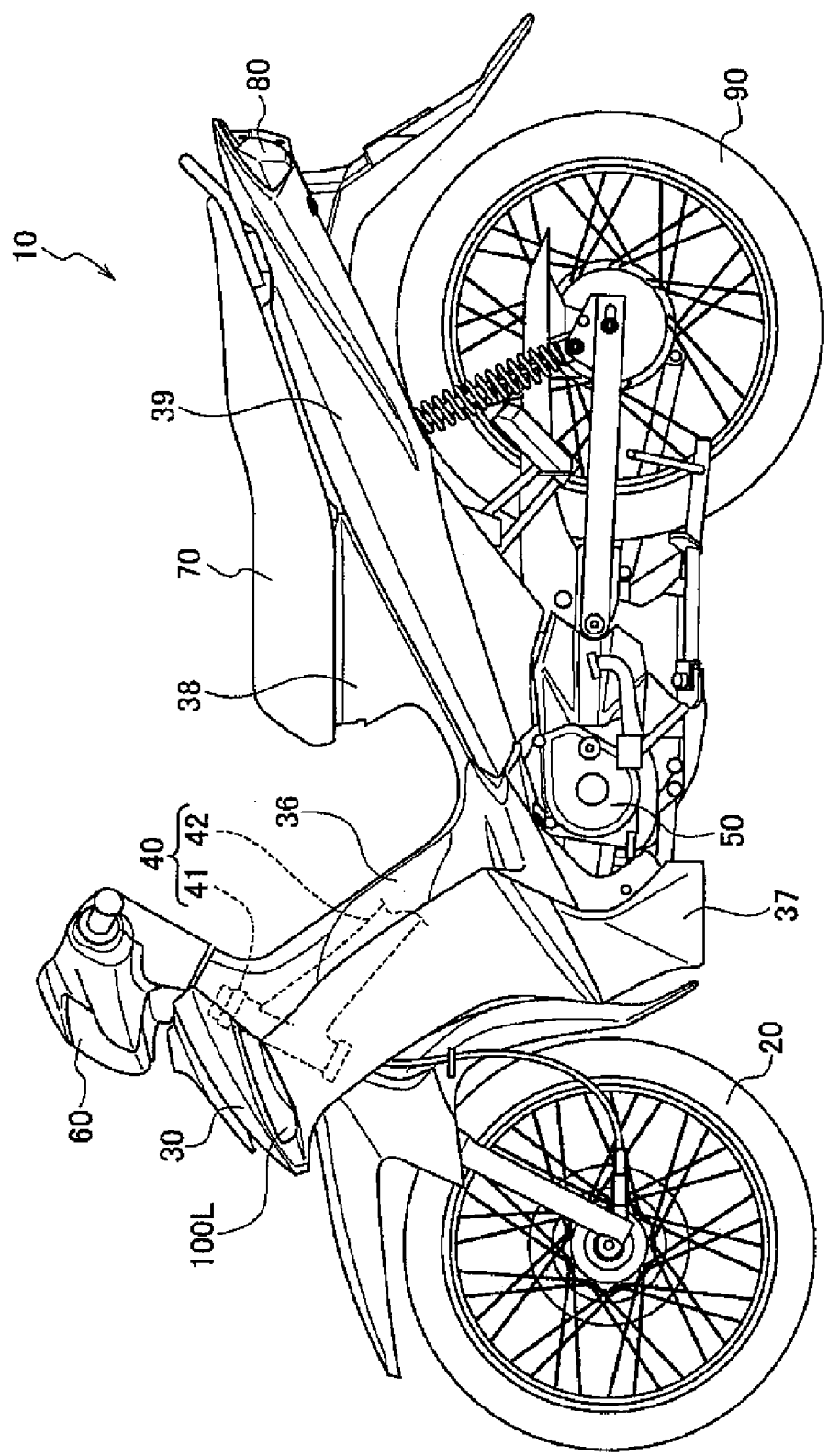
FIG. 1 is a left side view of a motorcycle according to an embodiment of the invention.

An embodiment of a straddle-type vehicle according to the invention is now described with reference to the drawings. The same or similar portions or parts in the drawings are denoted by the same or similar reference numerals. The drawings are schematic and ratios of respective dimensions may be different from those of actual ones. Accordingly, specific dimensions and the like should be determined taking the following description into consideration. Also, dimensional relationships and ratios may vary from FIG to FIG.

(Construction of Straddle-Type Vehicle)

FIG. 1 is a left side view of a motorcycle 10 that is a straddle-type vehicle according to an embodiment of the invention. Motorcycle 10 is a so-called underbone type motorcycle in which a body frame 40 is arranged in a lower region as compared with conventional straddle-type motorcycles. Motorcycle 10 includes a front wheel 20 and a rear wheel 90 driven by a driving force generated by an engine 50.

Motorcycle 10 is covered by a plurality of body covers including a body cowl 30, a leg shield 36, an undercover 37, a seat lower cover 38 and a side cover 39. Body cowl 30 is arranged forwardly of a steering head pipe 41. Leg shield 36 is arranged forwardly of legs of a rider seated on a seat 70 and is fixed to a down tube 42 extending downward from steering head pipe 41. Body cowl 30 is mounted to leg shield 36.

Flasher lamps 100L, 100R are arranged on body cowl 30. A headlight 60 mounted to a handle cover 21 is arranged above body cowl 30. Undercover 37 is arranged below leg shield 36 and is mounted to body cowl 30 and leg shield 36. Seat lower cover 38 is arranged below seat 70 and is connected to leg shield 36 and side cover 39. Side cover 39 is arranged on a left side of motorcycle 10. A side cover that is substantially symmetrical with side cover 39 is also arranged on a right side of motorcycle 10. Side cover 39 extends laterally of a tail lamp unit 80 from a rear end of leg shield 36.

Figure 2:
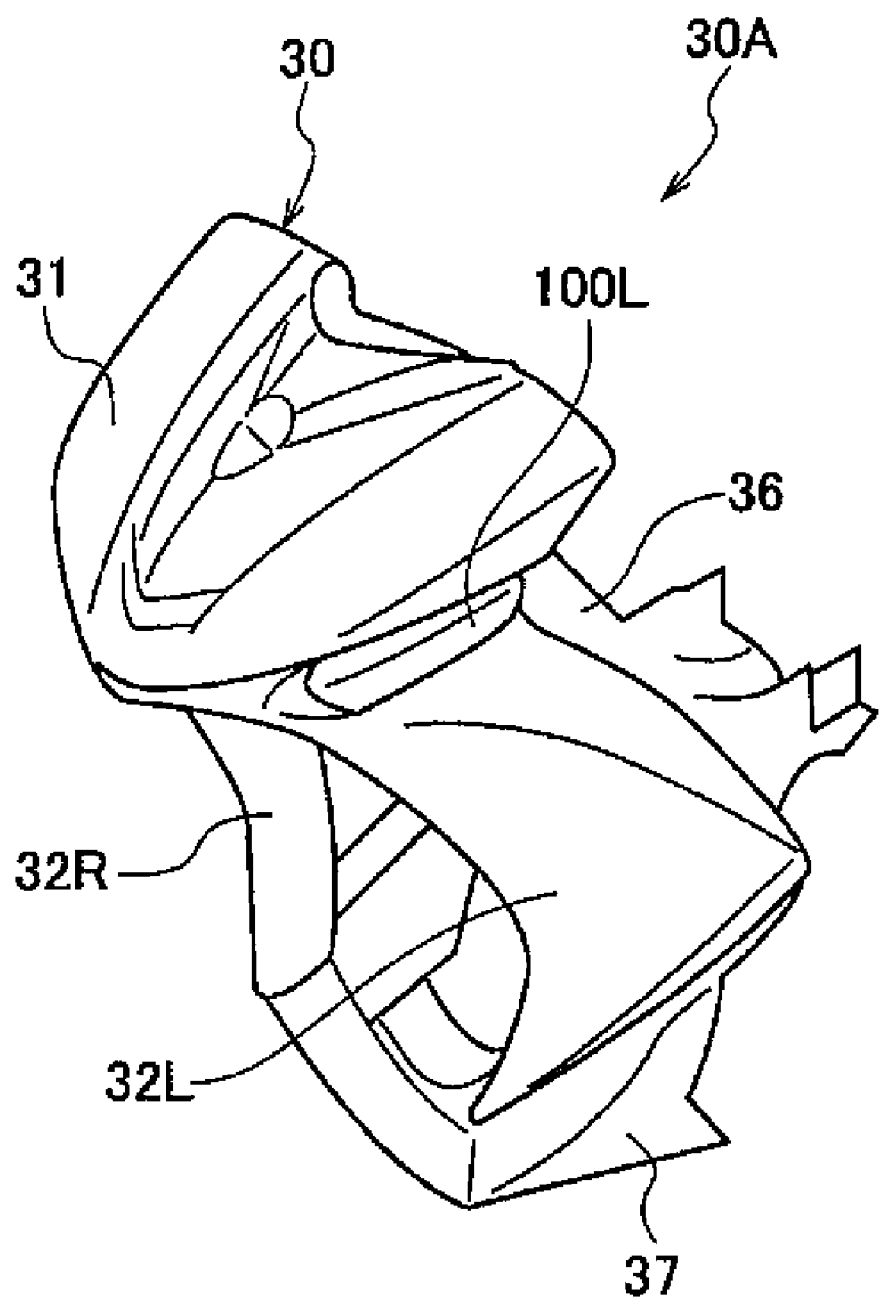
FIG. 2 is a schematic, perspective view of a body cover assembly according to an embodiment of the invention.

FIG. 2 is a schematic, perspective view of a body cover assembly 30A comprising body cowl 30, leg shield 36, and undercover 37. As shown in FIG. 2, body cowl 30 includes an upper cowl portion 31 and side cowl portions 32L, 32R.

Upper cowl portion 31 is arranged above front wheel 20. Upper cowl portion 31 is larger in width than front wheel 20 and extends outwardly of front wheel 20 in a vehicle width direction. Side cowl portions 32L, 32R in the form of legs are contiguous to upper cowl portion 31 and extend downward. Side cowl portion 32L is on the left side of motorcycle 10 and side cowl portion 32R is on the right side of motorcycle 10. A space, in which front wheel 20 (specifically, a front fender) is arranged, is formed between side cowl portions 32L and 32R.

Flasher lamp 100L (flasher lamp 100R) is arranged on a boundary of upper cowl portion 31 and side cowl portion 32L (side cowl portion 32R).

(Construction of Body Cowl and Flasher Lamp)

The construction of body cowl 30 and flasher lamps 100L, 100R is now explained.

(1) Construction of Body Cowl

Figure 3:
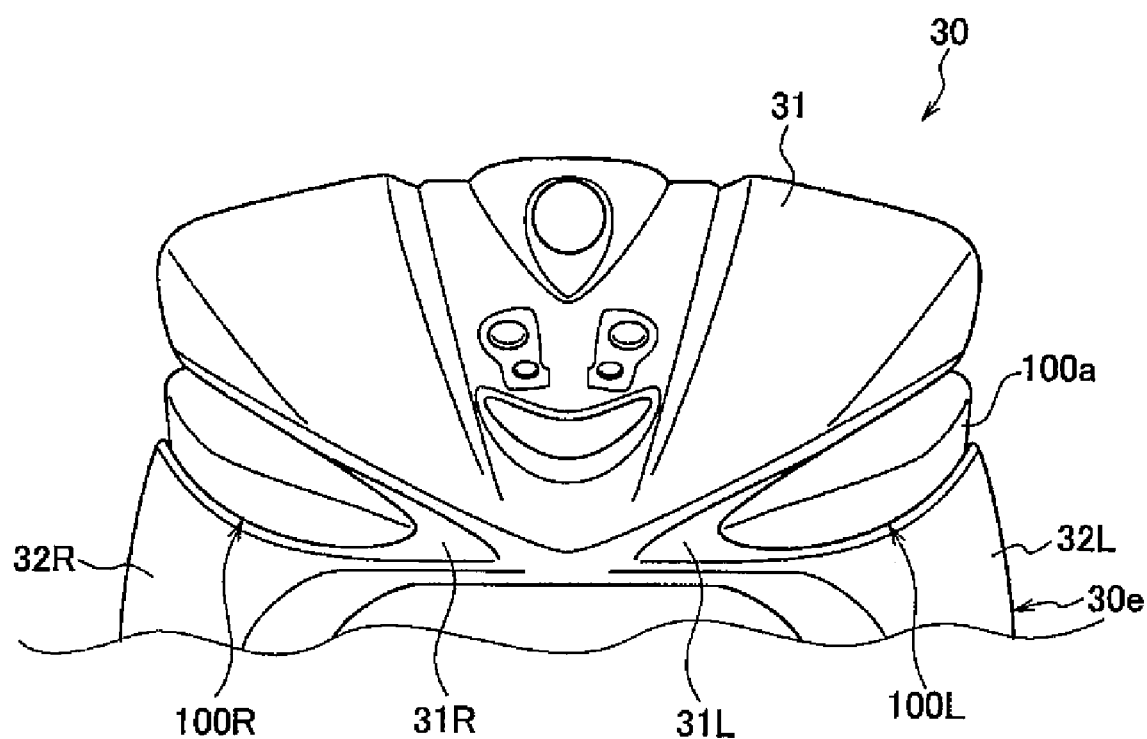
FIG. 3 is a front view of an upper portion of a body cowl according to an embodiment of the invention.
Figure 4:
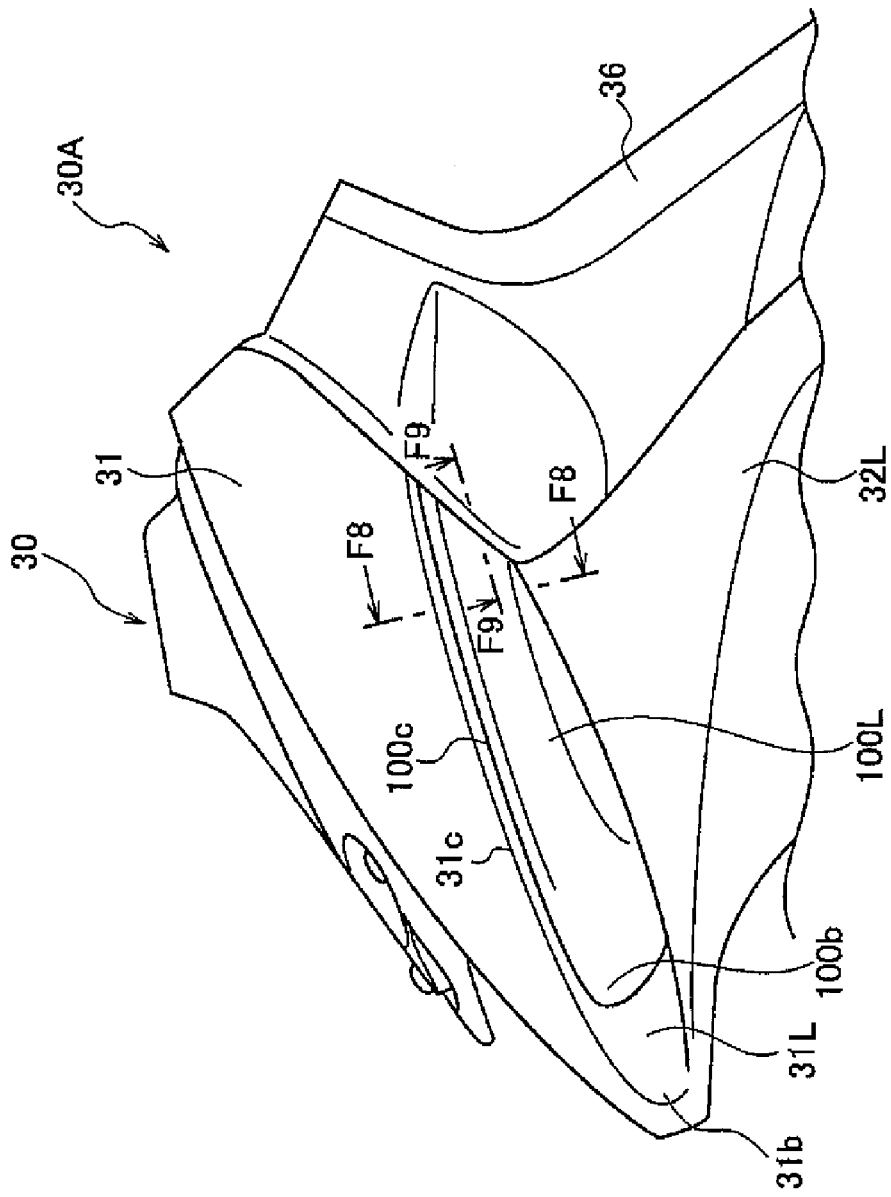
FIG. 4 is a left side view of an upper portion of the body cover assembly.

FIG. 3 is a front view of an upper portion of body cowl 30. FIG. 4 is a left side view of an upper portion of body cover assembly 30A. Upper cowl portion 31 of body cowl 30 is formed with grooves 31L, 31R, that extend longitudinally of motorcycle 10. Grooves 31L, 31R are flasher lamp accommodating recesses and open rearwardly of motorcycle 10. The following explanation is primarily with respect to the left side of motorcycle 10. Description of the right side is omitted since it is constructed in the same manner as the left side.

Flasher lamp 100L is arranged on a side end portion 30e of body cowl 30 and is accommodated in groove 31L. Flasher lamp 100L is outwardly convex in the vehicle width direction and extends to a rear end of upper cowl portion 31. An outer end 100a of flasher lamp 100L is positioned inwardly of side end portion 30e in the vehicle width direction. A front end 31b of groove 31L is positioned forwardly of a front end 100b of flasher lamp 100L.

Flasher lamp 100L is dimensionally larger in a longitudinal direction than in a vertical direction. That is, flasher lamp 100L is long sideways and is in the form of an airfoil when mounted to groove 31L.

(2) Construction of Flasher Lamp

Figure 5:
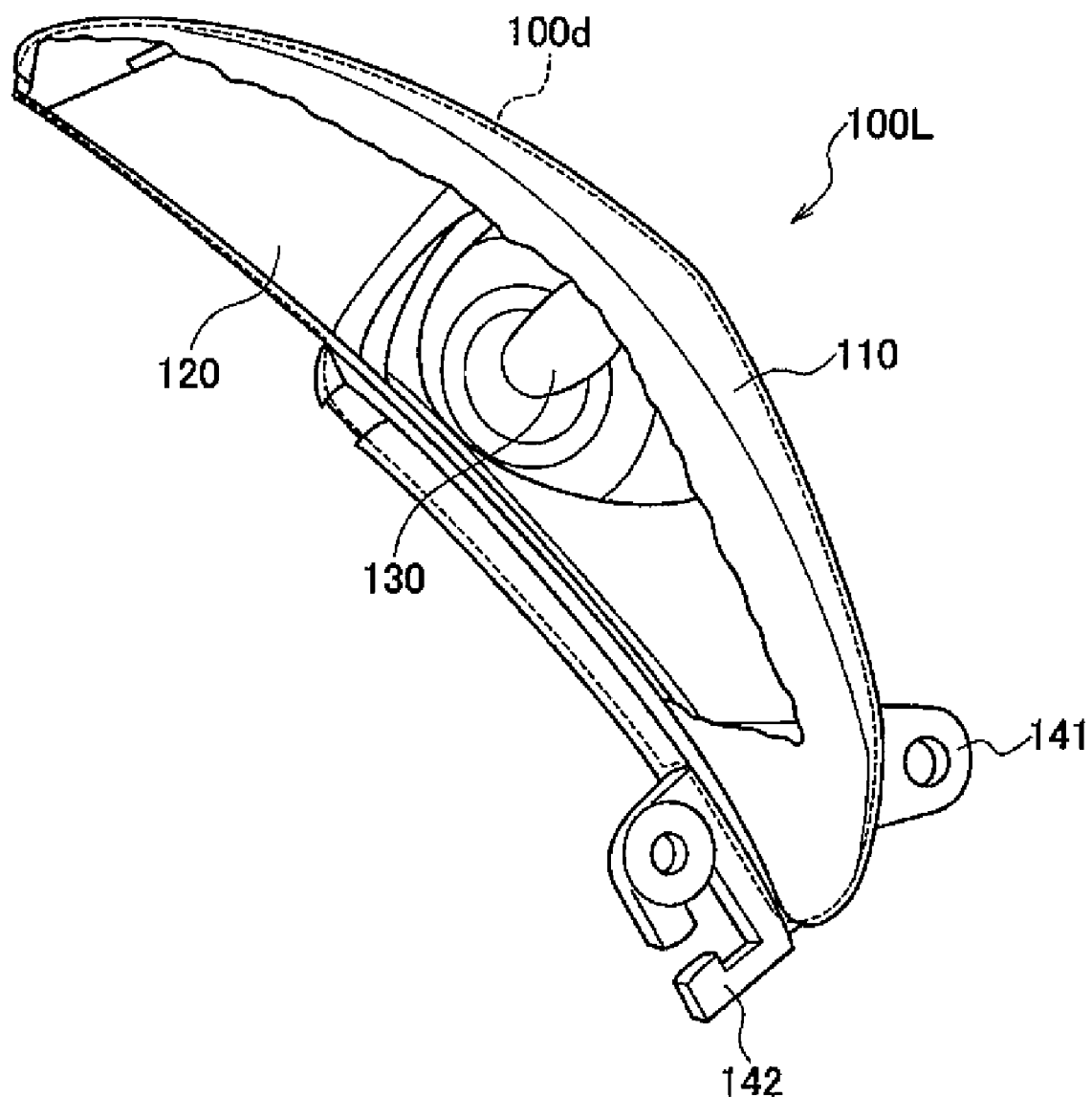
FIG. 5 is a perspective view of a front surface side of a flasher lamp according to an embodiment of the invention.
Figure 6:
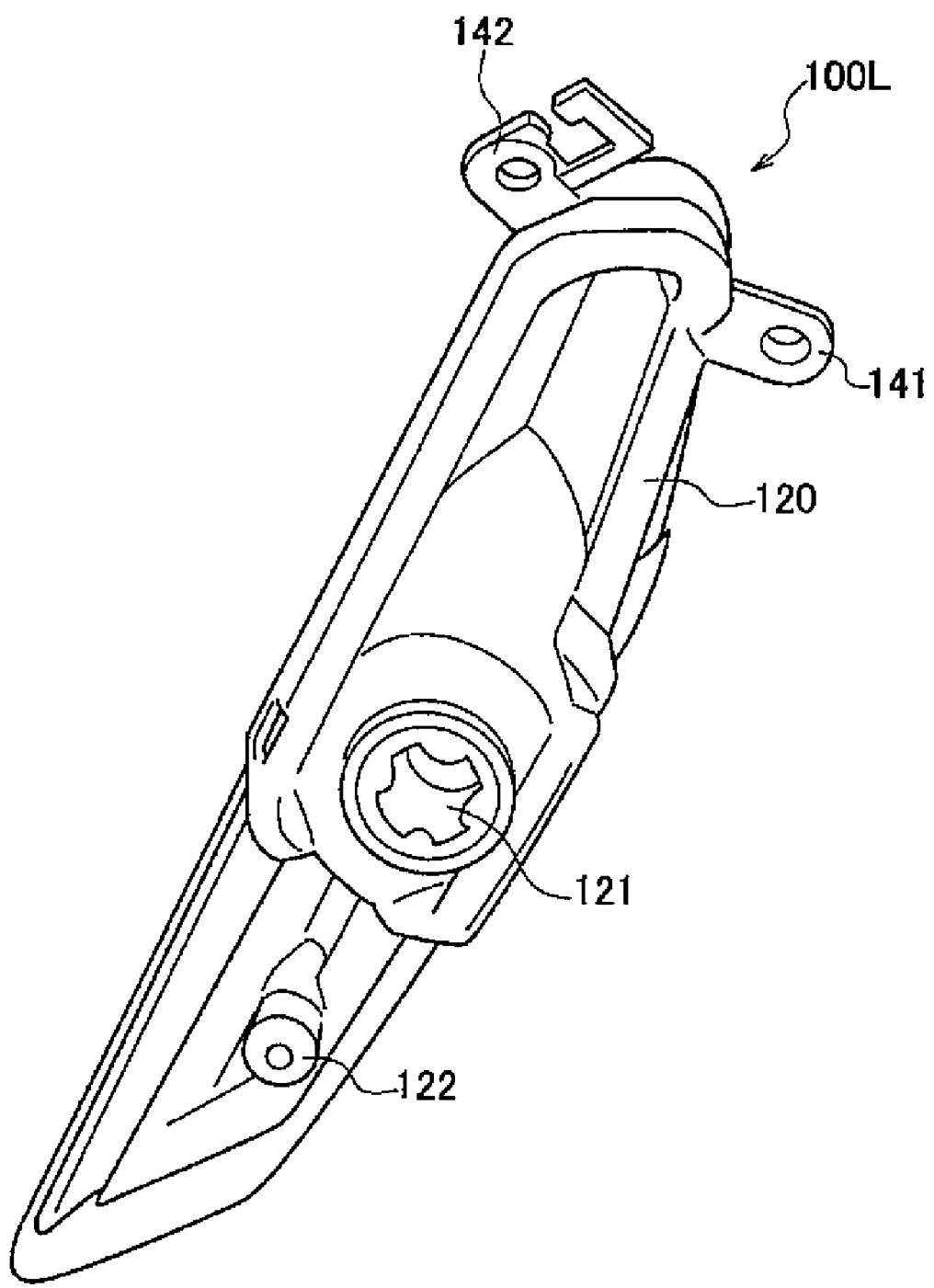
FIG. 6 is a perspective view of a back surface side of the flasher lamp.

FIG. 5 is a perspective view of a front surface side of flasher lamp 100L. FIG. 6 is a perspective view of a back surface side of flasher lamp 100L. As shown in FIGS. 5 and 6, flasher lamp 100L comprises a lens portion 110, a body portion 120 and a flasher bulb 130. In one embodiment, lens portion 110 is an amber-colored (or orange-colored) lens. Lens portion 110 is mounted to body portion 120.

Body portion 120 is formed with a bulb hole 121, into which flasher bulb 130 is fitted, and a mount boss 122, which is used to mount flasher lamp 100L to body cowl 30. Body portion 120 also has mount stays 141, 142, for mounting flasher lamp 100L to body cowl 30. Flasher bulb 130 is fitted into bulb hole 121 formed on body portion 120 and flashes at predetermined intervals.

(3) Mounted State of Flasher Lamp

Figure 7:
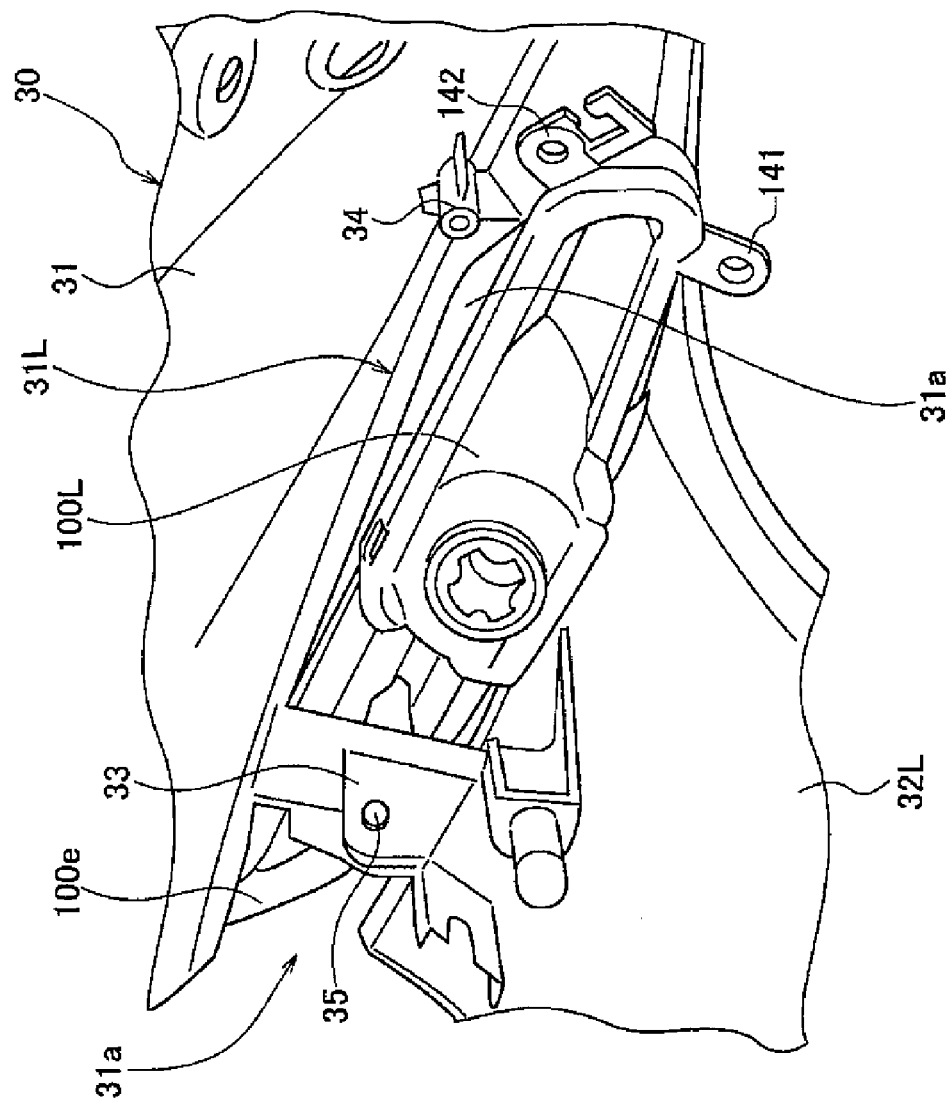
FIG. 7 is a view illustrating mounting of the flasher lamp.

A state in which flasher lamp 100L is mounted is described with reference to FIGS. 7-9. FIG. 7, which illustrates a way to mount flasher lamp 100L, shows the inside of body cowl 30 formed from upper cowl portion 31 and side cowl portion 32L. As shown in FIG. 7, groove 31L is formed with a flasher lamp hole 31a. Flasher lamp 100L is inserted into flasher lamp hole 31a. Specifically, a rear end 100e of flasher lamp 100L is first inserted into flasher lamp hole 31a from inside body cowl 30. An outer edge 100d (see FIG. 5) of flasher lamp 100L inserted into flasher lamp hole 31a is latched in flasher lamp hole 31a.

A wall portion 33, a mount boss 34, and a mount hole 35 are formed inside body cowl 30. Mount hole 35 is formed on wall portion 33, and mount boss 34 is formed on an inner side of upper cowl portion 31. Mount hole 35 is caused to overlap mount boss 122 and flasher lamp 100L is fixed to wall portion 33 by a screw. Mount boss 34 is caused to overlap mount stay 142 and flasher lamp 100L is fixed to upper cowl portion 31 by a screw. In addition, mount stay 141 is caused to overlap a mount boss formed on side cowl portion 32L and flasher lamp 100L is fixed to side cowl portion 32L by a screw.

Figure 8:
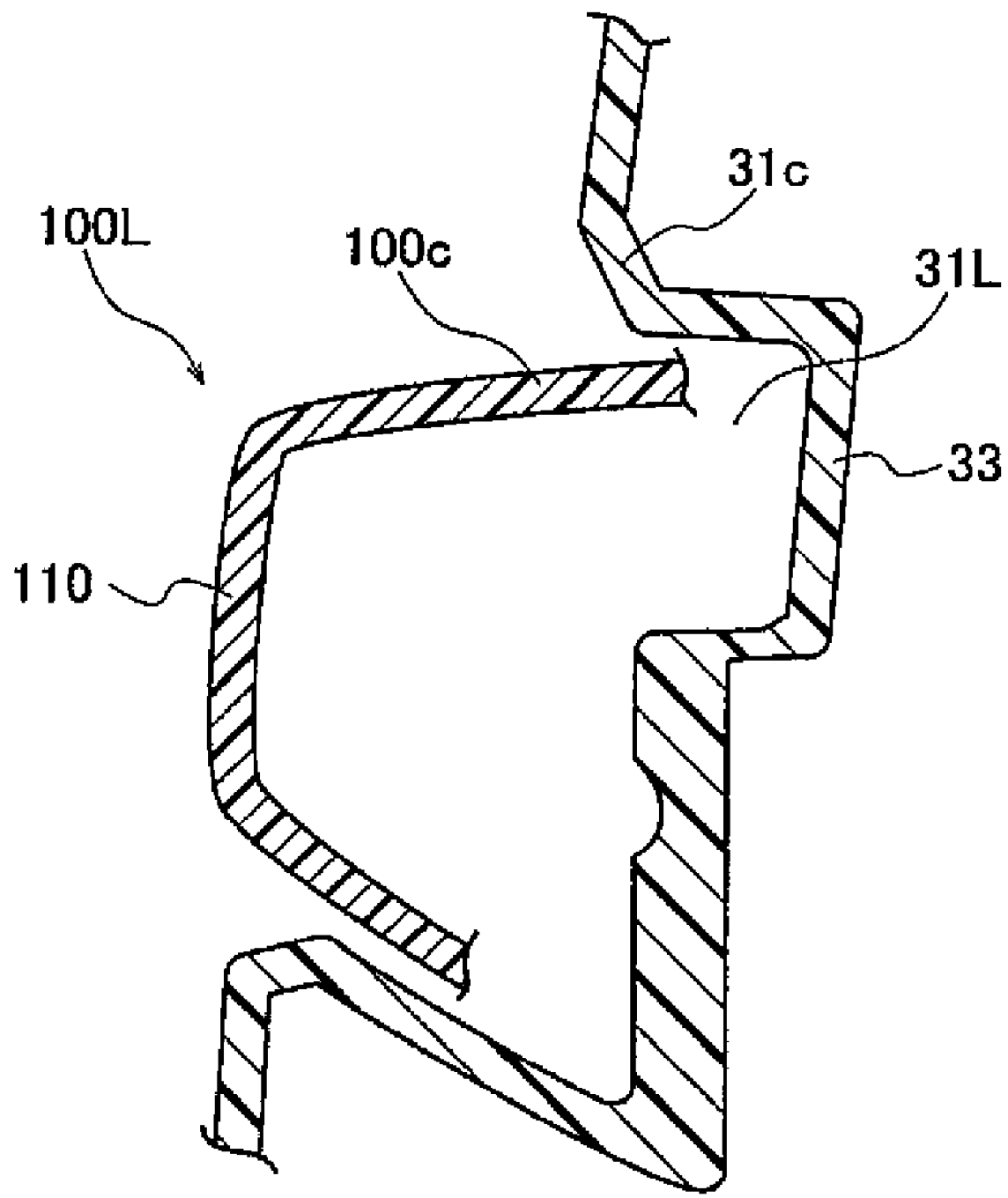
FIG. 8 is a cross sectional view taken along line F8-F8 of FIG. 4.

FIG. 8 is a cross sectional view taken along line F8-F8 of FIG. 4. As shown in FIGS. 4 and 8, an upper end 100c of flasher lamp 100L is positioned in substantially the same position as that of an upper end 31c of groove 31L. Also, lens portion 110 of flasher lamp 100L enters groove 31L.

Figure 9:
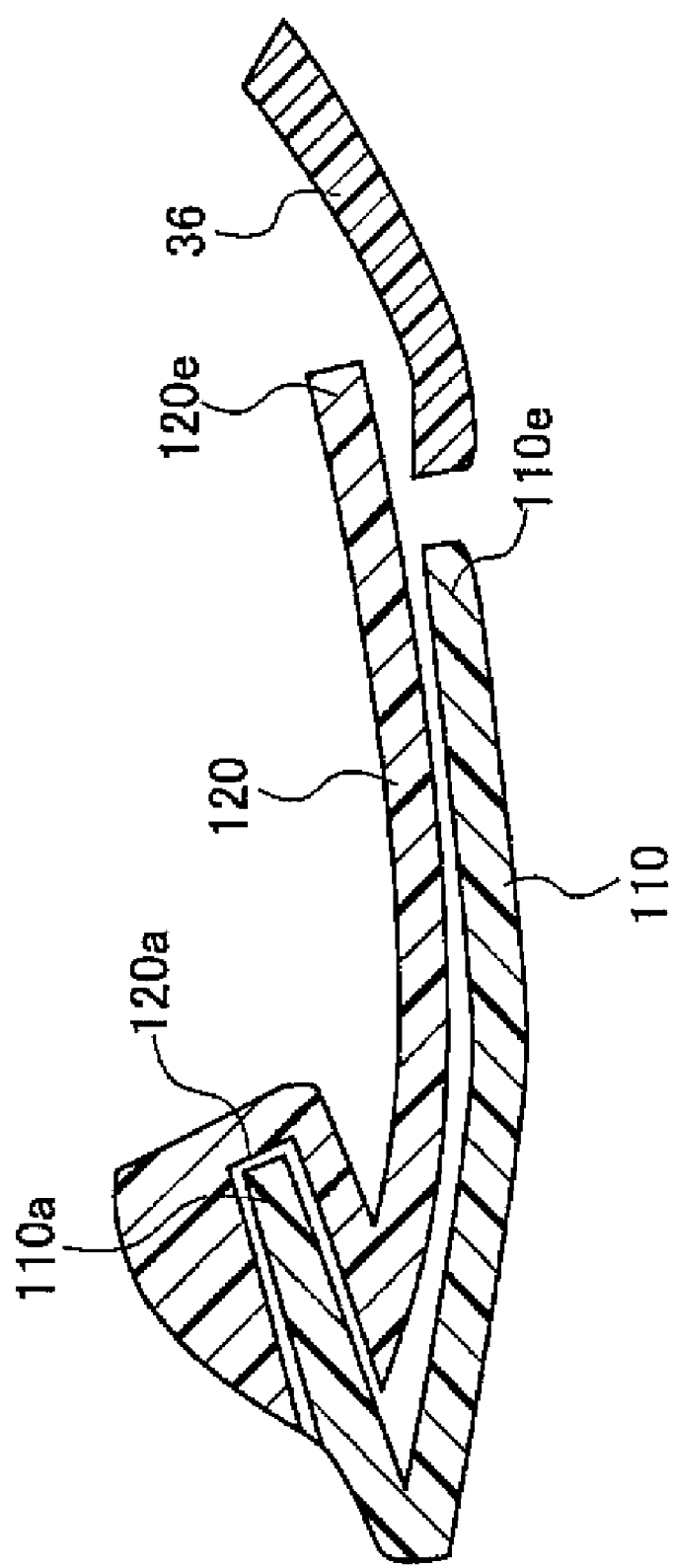
FIG. 9 is a cross sectional view taken along line F9-F9 of FIG. 4.

FIG. 9 is a cross sectional view taken along line F9-F9 of FIG. 4. As shown in FIG. 9, body portion 120 is formed with a recess 120a, which engages with a projection 110a formed on lens portion 110. A rear end 120e of body portion 120 is positioned inwardly of rear end 110e of lens portion 110 in the vehicle width direction. Also, rear end 120e extends rearwardly of rear end 110e. Leg shield 36 is arranged outwardly of rear end 120e in the vehicle width direction. That is, rear end 120e and leg shield 36 overlap each other in a side view of motorcycle 10.

(Function ·Effect)

With motorcycle 10, outer end 100a of flasher lamp 100L (100R) is positioned inwardly of side end portion 30e of body cowl 30 in the vehicle width direction. Therefore, the possibility of damage to flasher lamp 100L due to a fall or the like is reduced. Also, since flasher lamp 100L is arranged on side end portion 30e of body cowl 30, visibility of flasher lamp 100L is ensured.

According to the embodiment, front end 31b of groove 31L is positioned forwardly of front end 100b of flasher lamp 100L. Also, flasher lamp 100L is dimensionally larger in the longitudinal direction than in the vertical direction, and extends to the rear end of body cowl 30 in the form of an airfoil in a side view. Further, groove 31L opens rearward. Therefore, travel wind flowing around flasher lamp 100L is efficiently rectified.

According to the embodiment, upper end 100c of flasher lamp 100L is positioned in substantially the same position as that of upper end 31c of groove 31L. Specifically, lens portion 110 of flasher lamp 100L enters groove 31L. Therefore, a range of irradiation by flasher lamp 100L in the vertical direction is enlarged while decreasing the possibility that flasher lamp 100L is damaged.

According to the embodiment, flasher lamp 100L is inserted into flasher lamp hole 31a from inside body cowl 30. Therefore, flasher lamp 100L can be longer in the longitudinal direction as compared with a method in which flasher lamp 100L is inserted into groove 31L from outside body cowl 30. Specifically, since body portion 120 of flasher lamp 100L is arranged inside body cowl 30, lens portion 110 exposed outside body cowl 30 can be made small in size. Therefore, flasher lamp 100L can be made longer in the longitudinal direction.

OTHER EMBODIMENTS

As described above, the invention has been disclosed by way of an embodiment of the invention. However, the description and drawings that form the disclosure do not limit the invention. Various, alternative embodiments will be apparent to those skilled in the art from the disclosure.

For example, groove 31L (31R) and flasher lamp 100L (100R) are not limited in shape to the embodiment. For example, front end 31b of groove 31L (31R) may not be positioned forwardly of front end 100b of the flasher lamp.

In this manner, the invention includes various embodiments not described herein. Accordingly, the scope of the invention should be determined only by to the following claims.

The invention claimed is:

1. A straddle-type vehicle comprising:
a steering head pipe;
a body cowl arranged forwardly of the steering head pipe; and
a flasher lamp arranged on a side end portion of the body cowl, wherein
the body cowl includes a flasher lamp accommodating recess that extends longitudinally of the straddle-type vehicle and through a rear edge of the body cowl,
the flasher lamp is outwardly convex in a vehicle width direction,
the flasher lamp is accommodated in the flasher lamp accommodating recess, and
an outer end of the flasher lamp is positioned inwardly of an upper outermost portion of the side end portion of the body cowl located above the flasher lamp and inwardly of a lower outermost portion of the side end portion of the body cowl located below the flasher lamp in the vehicle width direction.

2. The straddle-type vehicle according to claim 1, wherein a front end of the flasher lamp accommodating recess is positioned forwardly of a frontmost end of the flasher lamp.

3. The straddle-type vehicle according to claim 1, wherein an upper end of the flasher lamp is positioned in substantially the same position as an upper end of the flasher lamp accommodating recess.

4. The straddle-type vehicle according to claim 1, wherein the flasher lamp is longer in a longitudinal direction than in a vertical direction.

5. The straddle-type vehicle according to claim 4, wherein the flasher lamp is in a form of an airfoil in a side view of the straddle-type vehicle.

6. The straddle-type vehicle according to claim 1, wherein the flasher lamp accommodating recess is formed with a flasher lamp hole, into which the flasher lamp is inserted and which is latched on an outer edge of the flasher lamp, and the flasher lamp is inserted into the flasher lamp hole from inside the body cowl.

7. The straddle-type vehicle according to claim 1, wherein, in a front view of the vehicle, the outer end of the flasher lamp is not covered by the side end portion of the body cowl.

8. The straddle-type vehicle according to claim 1, wherein, in a front view of the vehicle, the outer end of the flasher lamp is positioned inwardly of the side end portion of the body cowl located above a horizontal line extending through an uppermost portion of the flasher lamp.

9. The straddle-type vehicle according to claim 8, wherein, in a front view of the vehicle, the outer end of the flasher lamp is positioned inwardly of the side end portion of the body cowl located below a horizontal line extending through a lowermost portion of the flasher lamp.

10. A straddle-type vehicle comprising:
a steering head pipe;
a body cowl arranged forwardly of the steering head pipe; and
a flasher lamp arranged on a side end portion of the body cowl, wherein
the flasher lamp is outwardly convex in a vehicle width direction,
the body cowl is formed with a flasher lamp accommodating recess that extends longitudinally of the straddle-type vehicle; and
an outer end of the flasher lamp is positioned inwardly of an upper outermost portion of the side end portion of the body cowl located above the flasher lamp and inwardly of a lower outermost portion of the side end portion of the body cowl located below the flasher lamp in the vehicle width direction.

11. The straddle-type vehicle according to claim 10, wherein, in a side view of the vehicle, the flasher lamp extends to a rear end of the body cowl.

12. The straddle-type vehicle according to claim 10, wherein a frontmost end of the flasher lamp accommodating recess is positioned forwardly of a front end of the flasher lamp.

13. The straddle-type vehicle according to claim 10, wherein an upper end of the flasher lamp is positioned in substantially the same position as an upper end of the flasher lamp accommodating recess.

14. The straddle-type vehicle according to claim 10, wherein, in a front view of the vehicle, the outer end of the flasher lamp is not covered by the side end portion of the body cowl.

15. The straddle-type vehicle according to claim 10, wherein, in a front view of the vehicle, the outer end of the flasher lamp is positioned inwardly of the side end portion of the body cowl located above a horizontal line extending through an uppermost portion of the flasher lamp.

16. The straddle-type vehicle according to claim 15, wherein, in a front view of the vehicle, the outer end of the flasher lamp is positioned inwardly of the side end portion of the body cowl located below a horizontal line extending through a lowermost portion of the flasher lamp.

* * * * *